(12) United States Patent
Tanimoto et al.

(10) Patent No.: US 7,598,469 B2
(45) Date of Patent: Oct. 6, 2009

(54) VEHICLE DOOR HANDLE DEVICE

(75) Inventors: Tetsurou Tanimoto, Anjo (JP); Kouichi Nagata, Obu (JP); Masaki Nishikawa, Kariya (JP); Noriyasu Onishi, Nishikasugai-gun (JP); Osamu Kondo, Toyota (JP); Hajime Emura, Farmington Hills, MI (US)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 832 days.

(21) Appl. No.: 10/829,444

(22) Filed: Apr. 22, 2004

(65) Prior Publication Data

US 2005/0006909 A1      Jan. 13, 2005

(30) Foreign Application Priority Data

Apr. 22, 2003   (JP) ............................. 2003-117478

(51) Int. Cl.
*H01H 13/14*   (2006.01)
(52) U.S. Cl. ..................... 200/520; 200/341; 200/61.62
(58) Field of Classification Search ................ 200/600, 200/61.62, 520–572, 341
See application file for complete search history.

(56) References Cited

U.S. PATENT DOCUMENTS

| 5,632,168 | A | 5/1997 | Yano | |
| 6,626,473 | B1 * | 9/2003 | Klein et al. | 292/347 |
| 6,648,493 | B2 * | 11/2003 | Klein | 362/501 |
| 6,740,834 | B2 * | 5/2004 | Sueyoshi et al. | 200/600 |
| 6,769,154 | B1 | 8/2004 | Klein et al. | |
| 6,933,831 | B2 | 8/2005 | Ieda et al. | |
| 7,057,124 | B2 * | 6/2006 | Ieda et al. | 200/61.62 |
| 7,199,317 | B2 * | 4/2007 | Ieda et al. | 200/61.62 |
| 2004/0217601 | A1 * | 11/2004 | Garnault et al. | 292/336.3 |
| 2005/0115810 | A1 * | 6/2005 | Spies | 200/61.62 |

FOREIGN PATENT DOCUMENTS

| AU | 20067035 | | 4/2001 |
| DE | 196 33 894 | C2 | 2/1998 |
| DE | 198 56 902 | A1 | 6/2000 |
| DE | 199 43 986 | A1 | 3/2001 |
| DE | 10202371 | * | 1/2002 |
| DE | 102 29 446 | A1 | 3/2003 |
| EP | 1 284 334 | A1 | 2/2003 |
| FR | 2 807 090 | A1 | 10/2001 |
| JP | H07-279509 | (A) | 10/1995 |

(Continued)

OTHER PUBLICATIONS

Official Action issued on Oct. 5, 2007 by German Patent Office and English language translation of Official Action.

(Continued)

*Primary Examiner*—Kyung Lee
(74) *Attorney, Agent, or Firm*—Buchanan Ingersoll & Rooney PC

(57) ABSTRACT

A vehicle door handle device includes: an electric part which is received within an internal space formed within a door handle so as to form a gap between the electric part and an inner surface of the door handle; and an elastic member which is fixed to the electric part, and is pressed against the inner surface of the door handle.

16 Claims, 5 Drawing Sheets

FOREIGN PATENT DOCUMENTS

| | | |
|---|---|---|
| JP | 7317386 (A) | 12/1995 |
| JP | 10-308149 | 11/1998 |
| JP | 10-308149 A | 11/1998 |
| JP | 11274763 (A) | 10/1999 |
| JP | 2000-257313 (A) | 9/2000 |
| JP | 2002-030844 | 1/2002 |
| JP | 2002-195834 (A) | 7/2002 |
| JP | 2002-295094 (A) | 10/2002 |
| JP | 2003-505626 (A) | 2/2003 |

OTHER PUBLICATIONS

Japanese Office Action cited in corresponding Application No. 2003-117478 dated Apr. 21, 2009 with English Translation.

* cited by examiner

VEHICLE DOOR HANDLE DEVICE

BACKGROUND OF THE INVENTION

1. Field of the Invention

The present invention relates to a door handle device for a vehicle.

2. Background Art

There are known conventional vehicle door handle devices such for example as ones disclosed in JP-A-2002-30844 and JP-A-10-308149. In the vehicle door handle devices of JP-A-2002-30844 and JP-A-10-308149, an electric part for enhancing the convenience of a door opening/closing operation is received within a door handle forming a housing-like body thereof. In JP-A-2002-30844, for example, an antenna, etc., (which are electric parts) are received within the door handle, and are fixed thereto.

A conventional mode (first conventional mode) for fixing such an electric part (antenna) within a door handle. As shown in this Figure, the door handle 81 is divided into two sections, that is, a handle body and a handle cover secured to the handle body to cover the same. The antenna is received with an internal space of the door handle. Namely, the antenna is fixed to the handle body through a bracket which is mounted on the antenna by a press-deforming pin formed with the handle body. In this condition, the handle cover is attached to the handle body, so that the antenna is held between the handle body and the handle cover, and therefore is firmly fixed.

Another conventional mode (second conventional mode) for fixing an electric part (antenna) within a door handle. The door handle is also divided into two sections, that is, a handle body and a handle cover secured to the handle body to cover the same. The antenna is received with an internal space of the door handle. Namely, the antenna is fixed to the handle body through an adhesive double-coated tape bonded to the antenna In this condition, the handle cover is attached to the handle body, so that the antenna is held between the handle body and the handle cover, and therefore is firmly fixed.

In the first conventional mode, when the door handle is flexed by a load applied during the operation of the handle, the antenna, fixed to this door handle, is deformed, so that its performance is sometimes deteriorated. Therefore, in order to avoid the deterioration of the performance, the door handle (the handle body) is formed of a material of high stiffness such as a diecast zinc alloy. Therefore, the production cost, the time and labor for the assembling operation, and the weight are inevitably increased.

In the case where the door handle (the handle body) is molded of a resin material, a cross-sectional area of the handle body need to be increased so as to secure the required stiffness thereof, and as a result the door handle has inevitably has a relatively-large size. With this large-size design, an operation feeling (grip feeling) is degraded, and the degree of freedom of the design is lowered, and also the weight increases.

In the second conventional mode, it is also necessary to secure the required stiffness of the door handle (the handle body), and the same problems as described above are encountered.

SUMMARY OF THE INVENTION

It is an object of this invention to provide a vehicle door handle device in which the deterioration of a performance of an electric part can be suppressed without increasing the time and labor for the production and also without increasing the size of the door handle.

According to a first aspect of the invention, a vehicle door handle device includes: an electric part which is received within an internal space formed within a door handle so as to form a gap between the electric part and an inner surface of the door handle; and an elastic member which is mounted on the electric part, and is pressed against the inner surface of the door handle.

BRIEF DESCRIPTION OF THE DRAWINGS

The present invention may be more readily described with reference to the accompanying drawings:

FIG. 2A shows a condition in which a handle cover is attached to a handle body of FIG. 2B.

FIG. 5B shows a condition in which the handle of FIG. 5B is flexed.

DETAILED DESCRIPTION OF THE PREFERRED EMBODIMENTS

One preferred embodiment of the present invention will now be described with reference to FIGS. 1 to 6.

Figure 4:
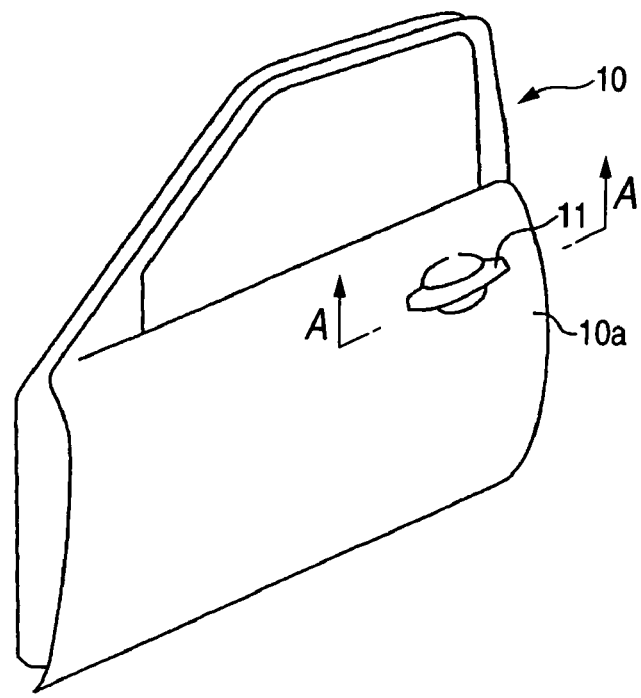
FIG. 4 is a perspective view showing a vehicle door.

FIG. 4 is a perspective view of a vehicle door. As shown in this Figure, an outside handle 11 for opening and closing the vehicle door 1 is mounted on the vehicle door 10, and projects outwardly therefrom. Namely, the outside handle 11 is mounted on that portion of a door outer panel 10a of the vehicle door 10 disposed close to a rear side of the vehicle.

Figure 1:
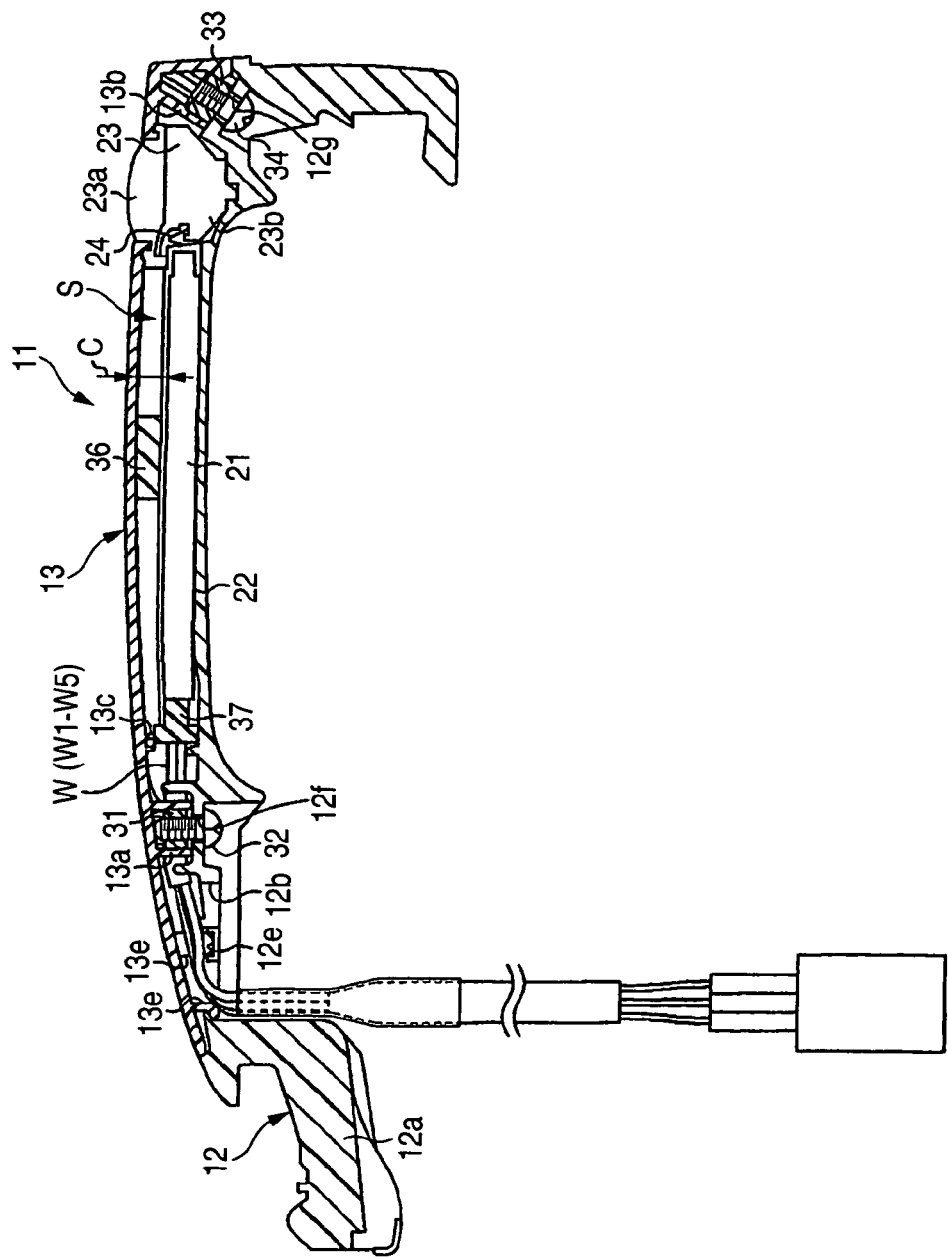
FIG. 1 is a cross-sectional view showing one preferred embodiment of the present invention.

FIG. 1 is a cross-sectional view taken along the line A-A of FIG. 4. As shown in this Figure, the outside handle 11 comprises a handle body 12, and a handle cover 13 mounted on the handle body 12 to cover the same, the handle cover 13 also serving to form a design surface of the outside of a vehicle body. A hinge arm portion 12a is formed at one end (left end in FIG. 1 which is disposed close to a front side of the vehicle) of the handle body 12. The handle body 12 as well as the handle cover 13 is molded of a synthetic resin.

The outside handle 11 has an internal space S which is defined by a closed space formed between the handle body 12 and the handle cover 13. A transmission antenna 21 and a door-unlocking sensor 22 (which serve as a first electric part forming an electric part) are received within this internal space S. The transmission antenna 21 and the door-unlocking sensor 22 are integrally superposed together such that the transmission antenna 21 faces the handle cover 13 while the door-unlocking sensor 22 is disposed in contiguous relation to the handle body 12.

The transmission antenna 21 comprises, for example, a loop antenna having a coil-like conductor wound on a ferrite member, and a block-like resin body in which this loop antenna is embedded. Electric signal wires of this transmission antenna are formed by wire harnesses W1 and W2 appearing at one end (left end in FIG. 1) of the transmission antenna 21. The transmission antenna 21 is an electric part forming a system for enhancing the convenience of the door opening/closing operation, and this transmission antenna transmits, for example, an authentication demand signal to a portable device carried by the user who opens and closes the door.

The door-unlocking sensor 22 comprises a single flat-plate electrode structure bonded on and along a bottom surface of the transmission antenna 21 (the resin body), and electric signal wires of this door-unlocking sensor are formed by a wire harness W3 appearing at the one end (left end in FIG. 1). The door-unlocking sensor 22 is an electric part forming the system for enhancing the convenience of the door opening/closing operation, and detects a change in capacity which occurs when a human body touches (or approach) the outside handle 11.

A door-locking switch 23 is provided at the other end portion (right end in FIG. 1 which is disposed close to the rear side of the vehicle) of the outside handle 11. This door-locking switch 23 comprises a button 23a mounted on the handle cover 13, and a detection portion 23b which is mounted on the handle body 12 in corresponding relation to the button 23a. The button 23a is exposed to the design surface of the outside handle 1 formed by the handle cover 13, and the detection portion 23b, serving as a second electric part, is received within the internal space S.

An FFC (Flexible Flat Cable) 24, serving as signal wires, is connected to the detection portion 23b. Wire harnesses W4 and W5 are embedded in the transmission antenna 21, and extend therethrough, and appear at the one end (left end in FIG. 1) thereof. One end of the FFC 24 is connected to the wire harnesses W4 and W5 at the other end (right end in FIG. 1) of the transmission antenna 21. Namely, one ends of the signal wires (FFC 24) of the detection portion 23b, are physically fixed to the transmission antenna 21 (the resin body) in which the wire harnesses W4 and W5 are embedded. The FFC 24 and the wire harnesses W4 and W5 jointly form the electric signal wires of the door-locking switch 23. The door-locking switch 23 is an electric part forming the system for enhancing the convenience of the door opening/closing operation, and for example, the depression of the button 23a is detected by the detection portion 23b, thereby detecting the door-locking operation by the user.

The wire harnesses W1 to W5 (hereinafter collectively referred to as "wire harnesses W"), appearing at the one end (left end in FIG. 1) of the transmission antenna 21, are extended therefrom in a longitudinal direction (in a right-left direction in FIG. 1) of the outside handle 11. Further, the distal end portions of the wire harnesses W are led out through a lead-out hole 12b (which is formed through the handle body 12 in a direction (an upward-downward direction in FIG. 1) substantially perpendicular to the above longitudinal direction, and is disposed adjacent to the hinge arm portions 12a), and is introduced into the interior of the vehicle door 10.

Figure 2A:
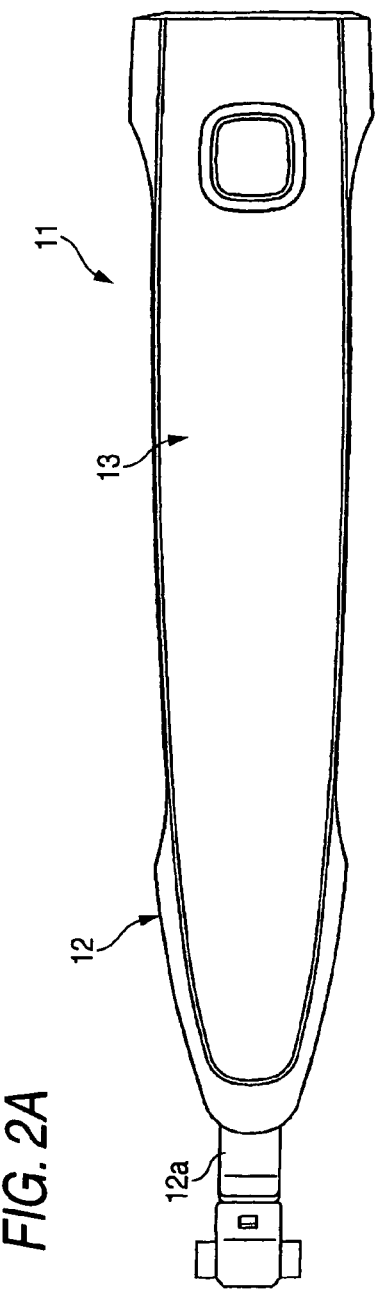
FIGS. 2A and 2B are elevational views of the above embodiment, respectively.
Figure 2B:
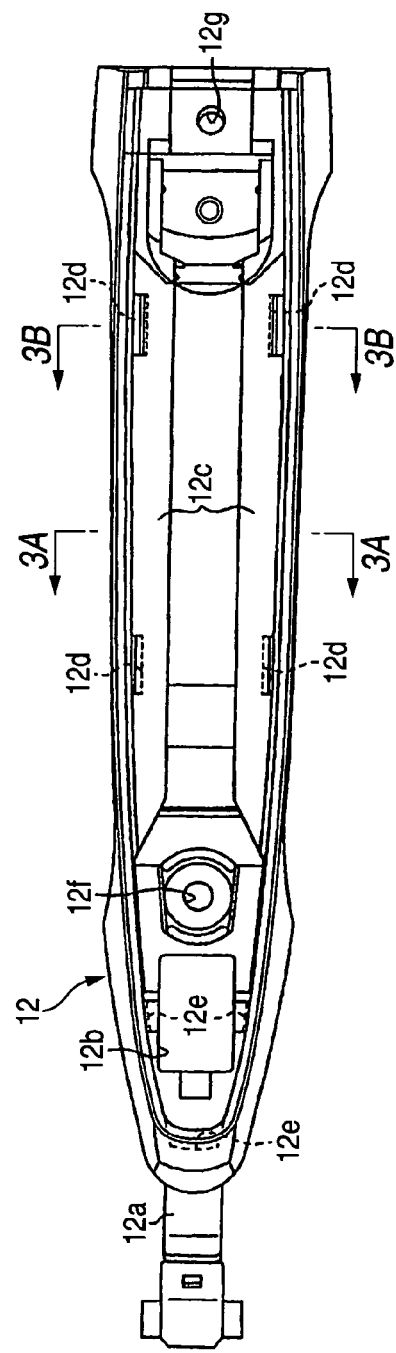
Figure 3A:
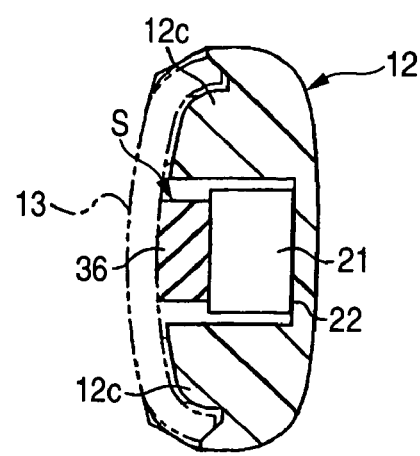
FIG. 3A is a cross-sectional view taken along the line 3A-3A of FIG. 2B.
Figure 3B:
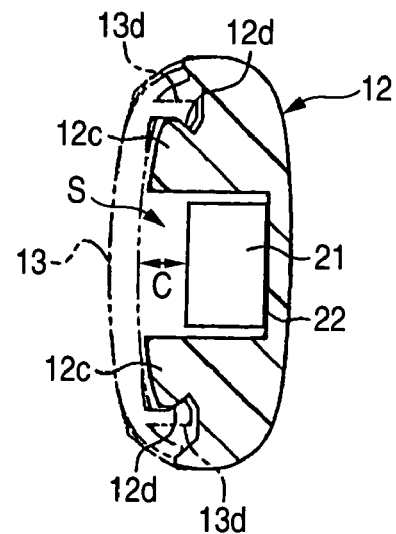
FIG. 3B is a cross-sectional view taken along the line 3B-3B of FIG. 2B.

The structure of fixedly connecting the handle body 12 and the handle cover 13 together, as well as the mode for supporting the transmission antenna 21 and so on, will now be described. FIGS. 2A and 2B are elevational views as seen from the upper side of FIG. 1, and FIG. 2A shows the handle body 12 and the handle cover 13, and FIG. 2B shows only the handle body 12. As shown in FIG. 2B, opposed reinforcing portions 12c are formed on the handle body 12, and extend along a longitudinal side wall of the handle body 12, and project toward each other in a widthwise direction thereof substantially perpendicular to the longitudinal direction thereof. As shown in FIGS. 3A and 3B which are cross-sectional views taken respectively along the line 3A-3A and the line 3B-3B of FIG. 2B, the reinforcing portions 12c are formed integrally respectively on the inner surface of the side wall of the handle body 12, and project beyond this side wall toward the handle cover 13. The internal space S is defined by a groove-like space formed between the two reinforcing portions 12c, and therefore the transmission antenna 21 and the door-unlocking sensor 22 are received in this internal space in such a manner that the antenna 21 and the sensor 22 are interposed between the two reinforcing portions 12c. In other words, the reinforcing portions 12c are formed to extend along the transmission antenna 21 and the door-unlocking sensor 22 received within the outside handle 11.

The transmission antenna 21 (and the door-unlocking sensor 22) is received within the door handle in such a manner that a gap C is formed between an outer side surface of the transmission antenna 21, facing the handle cover 13, and that surface (the inner surface of the outside handle 11) of the handle cover 13 opposed to the transmission antenna 21. A first elastic member 36, made of a rubber material, is bonded to the outer side surface of the transmission antenna 21, and is pressed against the above opposed surface of the handle cover 13. The dimension of the gap C is suitably set to such a value that the transmission antenna 21, etc., will not interfere with the inner surface of the outside handle 11 even when the outside handle 11 is flexed by a load produced during the operation of the handle.

A second elastic member 37, made of a rubber material, is mounted on the one end (left end in FIG. 1) of the transmission antenna 21. A projection is formed on one side surface of the second elastic member 37, and projects toward the opposed surface (the inner surface of the outside handle 11) of the handle cover 13. A projection 13c, corresponding to the projection of the second elastic member 37, is formed on the handle cover 13. Therefore, the second elastic member 37 is pressed against the opposed surface (the inner surface of the outside handle 11) of the handle cover 13 through the projection 13c.

As shown in FIG. 2B, a plurality of (two in this embodiment) retaining grooves 12d are formed in each of the reinforcing portions 12c, and are disposed adjacent to the side wall of the handle body 12, and the retaining grooves 12d in one of the reinforcing portions 12c are disposed respectively in registry with the retaining grooves 12d in the other reinforce portion 12c in the widthwise direction substantially perpendicular to the longitudinal direction. A plurality of (three in this embodiment) retaining grooves 12e are formed in one end portion (left end portion in FIG. 2B) of the side wall of the handle body 12, and are disposed adjacent to the lead-out hole 12b. On the other hand, retaining claws 13d (corresponding respectively to the retaining grooves 12d) for retaining engagement respectively in the retaining grooves 12d are formed on the handle cover 13 (see FIG. 3B). Also, retaining claws 13e (corresponding respectively to the retaining grooves 12e) for retaining engagement respectively in the retaining grooves 12e are formed on the handle cover 13 (see FIG. 1). The handle body 12 and the handle cover 13 are fixedly connected together by retainingly engaging the retaining claws 13d and 13e in the respective retaining grooves 12d and 12e. At this time, the transmission antenna 21 and so on, provisionally attached to the handle body 12, are supported within the outside handle 11 upon pressing of the first and second elastic members 36 and 37 against the opposed surface (the inner surface of the outside handle 11) of the handle cover 13.

As shown in FIG. 1, an insertion hole 12f is formed through that portion of the handle body 12 lying between the transmission antenna 21 and the lead-out hole 12b, and is disposed substantially parallel to the lead-out hole 12b. On the other hand, a boss portion 13a of a substantially cylindrical shape is formed on and projects from the handle cover 13 in substantially coaxial relation to the insertion hole 12f. A nut 31 is thermowelded to an inner peripheral surface of the boss portion 13a in substantially coaxial relation thereto. The handle body 12 and the handle cover 13 are fixed together at their one ends by a screw 32 passing through the insertion hole 12f (from the lower side in FIG. 1) and threaded into the nut 31.

An insertion hole 12g is formed through the other end portion (right end portion in FIG. 1) of the handle body 12 in an upper right direction in FIG. 1. On the other hand, a boss portion 13b of a substantially cylindrical shape is formed on and projects from the handle cover 13 in substantially coaxial relation to the insertion hole 12g. A nut 33 is thermowelded to an inner peripheral surface of the boss portion 13b in substantially coaxial relation thereto. The handle body 12 and the handle cover 13 are fixed together at their other ends by a screw 34 passing through the insertion hole 12g (from the lower left side in FIG. 1) and threaded into the nut 33.

As described above in detail, in this embodiment, the following advantageous effects can be obtained.

(1) In this embodiment, the transmission antenna 21, etc., are received in the outside handle 11, with the gap C formed between the transmission antenna 21 and the inner surface of the outside handle 11 (that is, the inner surface of the handle cover 13), and the first and second elastic members 36 and 37, pressed against the inner surface of the outside handle 11, are fixedly secured to the transmission antenna 21. Therefore, the transmission antenna 21, etc., are supported within the outside handle 11 by forces (press-contacting force) of pressing of the first and second elastic members 36 and 37 against the inner surface of the outside handle 11. Therefore, even when the outside handle 11 is flexed or elastically deformed from a condition of FIG. 5A into a condition of FIG. 5B by a load produced during the operation of the handle, this flexure is absorbed by the first and second elastic members 36 and 37, and the transmission antenna 21, etc., are moved within the range of the gap C between this transmission antenna and the inner surface of the outside handle 11, so that this deformation is suppressed. Also, the deterioration of the performances of the transmission antenna 21, etc., is also suppressed. And besides, the required stiffness of the outside handle 11 is reduced, and therefore even when the door handle is molded of a synthetic resin as in this embodiment, a large-size design thereof is avoided. The degrading of the operation feeling (grip feeling), a lowered degree of freedom of the design and the increased weight due to such a large-size design can be avoided. The production cost, the time and labor for the assembling operation and the weight can be more effectively prevented from increasing as compared with the case where part (for example, the handle body 12) of the outside handle 11 is formed of a material of high stiffness such as a diecast zinc alloy.

(2) In this embodiment, the second elastic member 37 is pressed against the inner surface of the outside handle 11 (that is, the inner surface of the handle cover 13) through the projection 13c. Therefore, the length of projecting of the projection 13c is suitably determined according to the distance between the second elastic member 37 and this inner surface, and by doing so, the suitable press-contacting force for supporting the transmission antenna 21, etc., can be set.

(3) In this embodiment, the reinforcing portions 12c are formed on the handle body 12, and extend along the transmission antenna 21, etc. Therefore, the stiffness is increased by these reinforcing portions 12c, so that the flexure of the outside handle 11 is suppressed.

(4) In this embodiment, the retaining grooves 12d, in which the retaining claws 13d are retainingly engaged, respectively, to fixedly connect the handle body 12 and the handle cover 13 together, are provided, utilizing the reinforcing portions 12c, and therefore the degree of freedom of the design can be enhanced, for example, as compared with the case where another shape for effecting this connection is provided.

Figure 5A:
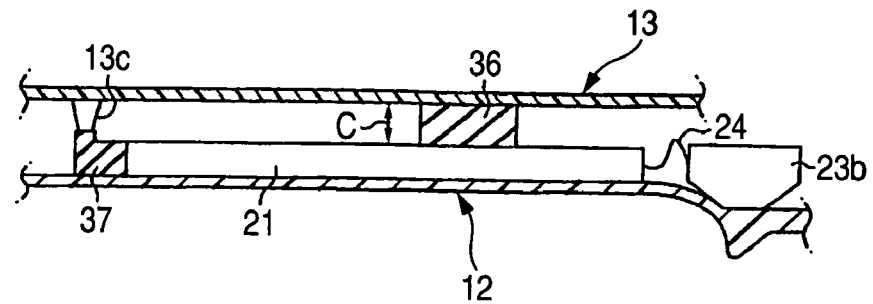
FIGS. 5A and 5B are schematic views showing the operation of the above embodiment.
Figure 5B:
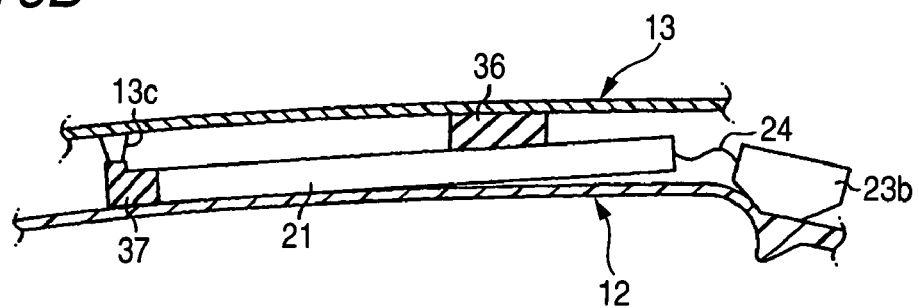

(5) In this embodiment, the signal wires (FFC 24) of the detection portion 23b, fixed to the transmission antenna 21, has flexibility, and therefore even when the outside handle 11 is flexed by a load produced during the operation of the handle as shown in FIGS. 5A and 5B, the displacement of the transmission antenna 21 and the detection portion 23b relative to each other can be absorbed only by the flexure of the FFC 24.

Figure 6:
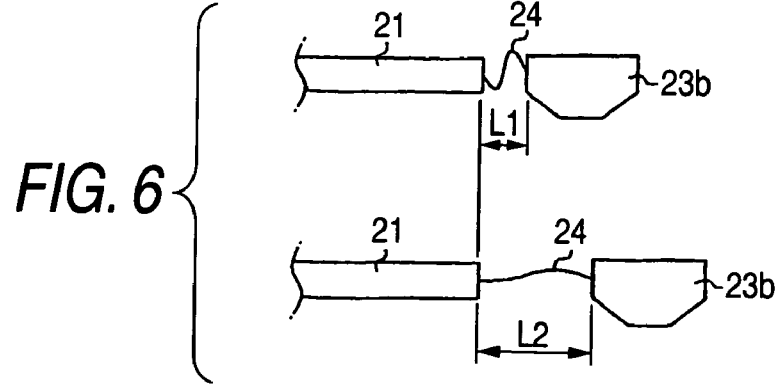
FIG. 6 is a schematic view showing the operation of the above embodiment.

As shown in FIG. 6, in the case where the detection portion 23b, provided within the door handle, is spaced a distance L1 from the distal end of the transmission antenna 21 and even in the case where the detection portion 23b is spaced a distance L2 (>L1) from the distal end of the transmission antenna 21, such spacing distances can be accepted by the flexing range of the FFC 24. Therefore, the general-purpose ability of the transmission antenna 21 and detection portion 23b for different types of door handles can be enhanced. Also, the degree of freedom of design of the door handle, having the transmission antenna 21 and the detection portion 23b, can be enhanced.

The present invention is not limited to the above embodiment, but can be modified as follows.

Figure 7:
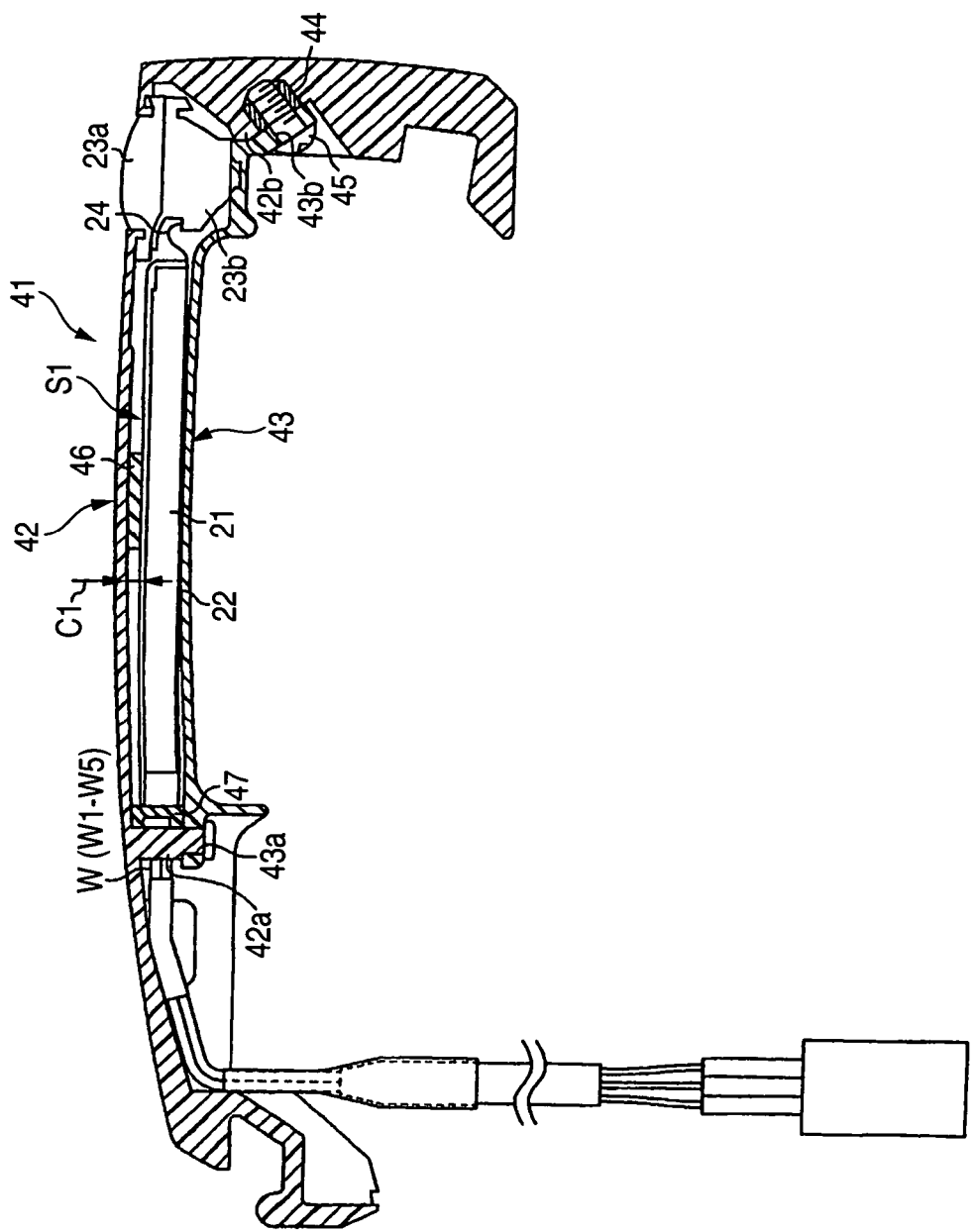
FIG. 7 is a cross-sectional view showing another embodiment of the invention.

In the above embodiment, there is adopted the so-called outside-split structure in which the outside handle 11 is divided into the two sections (that is, the handle body 12 and the handle cover 13) at its outside exposed to the exterior of the vehicle body. In contrast with this, there can be adopted a so-called inside-split structure in which an outside handle 41, shown in FIG. 7, is divided into two sections (that is, a handle body 42 and a handle cover 43) at its inside. Namely, this outside handle 41 comprises the handle body 42 forming a design surface of the outside of a vehicle body, and the handle cover 43 mounted on the handle body 42 to cover the same. The outside handle 41 has an internal space S1 defined by a closed space formed between the handle body 42 and the handle cover 43. A transmission antenna 21, a door-unlocking sensor 22 and a detection portion 23b are received within this internal space S1 as in the above embodiment. The transmission antenna 21 is received within the door handle in such a manner that a gap C1 is formed between an outer side surface of the transmission antenna 21, facing the handle body 42, and that surface (an inner surface of the outside handle 41) of the handle body 42 opposed to the transmission antenna 21. An elastic member 46, made of a rubber material, is bonded to the outer side surface of the transmission antenna 21, and is pressed against the above opposed surface of the handle body 42. An elastic member 47, made of a rubber material, is mounted on one end (left end in FIG. 7) of the transmission antenna 21. Even with these modifications, similar effects as achieved in the above embodiment can be obtained. Particularly, reinforcing portions are formed on one of the handle body 42 and the handle cover 43, and retaining grooves are formed in these reinforcing portions. Retaining claws for retaining engagement respectively in the retaining grooves to fixedly connect the handle body 42 and the handle cover 43 together are formed on the other of the handle body 42 and the handle cover 43.

An insertion hole 43a is formed through one end portion (left end portion in FIG. 7) of the handle cover 43. On the other hand, a thermo-fastening pin 42a is formed on and projects from the handle body 42 in substantially coaxial relation to the insertion hole 43a. The handle body 42 and the handle cover 43 are fixed together at their one ends by the pin 42a which passes through the insertion hole 43a, and is thermally deformed.

An insertion hole 43b is formed through the other end portion (right end portion in FIG. 7) of the handle cover 43 in an upper right direction in FIG. 7. On the other hand, a boss portion 42b is formed on the handle body 42 in substantially coaxial relation to the insertion hole 43b. A nut 44 is thermowelded to an inner peripheral surface of the boss portion 42b in substantially coaxial relation thereto. The handle body 42 and the handle cover 43 are fixed together at their other ends by a screw 45 passing through the insertion hole 43b (from the lower left side in FIG. 7) and threaded into the nut 44.

In the above embodiment, the elastic member 36, 46 is fixed to the transmission antenna 21 (the resin body) by bonding. However, within the door handle, the first elastic member 36 is held between (or gripped by) the handle cover 13 and the transmission antenna, while the elastic member 46 is held between the handle body 42 and the transmission antenna, and by doing so, the elastic member 36, 46 is substantially fixed to the transmission antenna 21, etc. Therefore, even when the elastic member 36, 46 is fixed to the transmission antenna 21, etc., only by this gripping construction, this construction will not depart from the subject matter of the invention.

In the above embodiment, the number and arrangement of the retaining grooves 12d, formed in each reinforcing portion 12c, are given merely as one example, and may be changed.

In the above embodiment, although the reinforcing portions 12c are formed on the handle body 12, such reinforcing portions may be formed on the handle cover 13, or such reinforcing portions may be formed on both of the handle body 12 and the handle cover 13 in so far as these reinforcing portions do not interfere with each other.

In the above embodiment, the gap C is formed between the transmission antenna 21 and the handle cover 13, a gap may be formed between the door-unlocking sensor 22 and the handle body 12. In the example of FIG. 7, although the gap C1 is formed between the transmission antenna 21 and the handle body 42, a gap may be formed between the door-unlocking sensor 22 and the handle cover 43.

In the above embodiment, the mode for fixing the elastic member to the transmission antenna 21, etc., is merely one example.

In the above embodiment, although there are used the first and second elastic members 36 (46) and 37 (47) each made of the rubber material, any other suitable members, such for example as springs, may be used.

In the above embodiment, the FFC 24 is used as the signal wires, for example, an FFC (Flexible Printed Circuit) board or a CIC (Conductive Ink Circuitry) may be used.

In the above embodiment, the electric parts, received within the outside handle 11, 41, may be suitably changed in accordance with the door opening/closing function. Namely, the electric parts may be suitably changed in accordance with the adopted system (such as an E-latch system and a smart entry system).

As described above in detail, according to the invention, the deterioration of the performance of the electric part can be suppressed without increasing the time and labor for the production and also without increasing the size of the handle.

What is claimed is:

1. A vehicle door handle device comprising:
    a handle body;
    a handle cover attached to the handle body;
    an electric part disposed in an internal space formed by the handle body and the handle cover, the electric part having a first face facing one of the handle body and the handle cover and a second face facing the other of the handle body and the handle cover so that a gap exists between the second face and the other of the handle body and the handle cover; and
    a first elastic member disposed within the gap at a grip portion of the vehicle door handle device, the first elastic member contacting the second face of the electric part, and pressed against an inner surface of both the other of the handle body and the handle cover and the second face of the electric part within the internal space.

2. The vehicle door handle device according to claim 1, further comprising a second elastic member attached to an edge of the electric part,
    wherein a projection is formed on the inner surface of the door handle, projecting correspondingly to the second elastic member, and
    wherein the second elastic member is pressed against the inner surface of the door handle through the projection.

3. The vehicle door handle device according to claim 1, wherein
    at least one of the handle body and the handle cover has a reinforcing portion formed along the electric part.

4. The vehicle door handle device according to claim 3,
    wherein the reinforcing portion is formed on one of the handle body and the handle cover;
    the reinforcing portion has a retaining groove; and
    the other of the handle body and the handle cover has a retaining claw engageable with the retaining groove used for fixing the handle body and the handle cover to each other.

5. The vehicle door handle device according to claim 1,
    wherein the electric part includes a first electric part, and a second electric part having signal wires fixed to the first electric part; and
    the signal wires are flexible.

6. The vehicle door handle device according to claim 1, wherein the electric part is an antenna or a sensor.

7. The vehicle door handle device according to claim 1,
    wherein the grip portion of the vehicle door handle device is formed between a hinge arm portion formed at one end of the vehicle door device in a longitudinal direction and an attaching portion formed at the other end of the door handle device in the longitudinal direction, and the vehicle door handle is pivotally mounted relative to a door outer panel via the hinge arm portion.

8. The vehicle door handle device according to claim 1, wherein the first elastic member has a first elastic face contacting the second face of the electric part and a second elastic face opposite to the first elastic face, the second elastic face contacting the inner surface of the other of the handle body and the handle cover.

9. The vehicle door handle device according to claim 8, wherein the first elastic member is entirely disposed between the other of the handle body and the handle cover and the second face of the electric part.

10. A vehicle door handle device comprising:
    a door handle including a handle body, a handle cover, and a hinge arm portion formed at one end of the door handle and pivotally mounted relative to a door outer panel via the hinge arm portion;
    an electric part disposed in an internal space formed by the handle body and the handle cover, the electric part having a first face facing one of the handle body and the handle cover and a second face facing the other of the handle body and the handle cover so that a gap exists between the second face and the other of the handle body and the handle cover; and a first elastic member disposed within the gap at a grip portion of the vehicle door handle device, the first elastic member contacting the second face of the electric part, and pressed against an inner surface of both the other of the handle body and the handle cover and the second face of the electric part within the internal space.

11. The vehicle door handle device according to claim 10, wherein the electric part is an antenna or a sensor.

12. The vehicle door handle device according to claim 10, wherein the grip portion of the vehicle door handle device is formed between a hinge arm portion formed at one end of the vehicle door handle device in a longitudinal direction and an attaching portion formed at the other end of the door handle device in the longitudinal direction, and the vehicle door handle is pivotally mounted relative to a door outer panel via the hinge arm portion.

13. A vehicle door handle device comprising:
a handle body;
a handle cover attached to the handle body;
an electric part disposed in an internal space formed by the handle body and the handle cover, the electric part having a first face facing one of the handle body and the handle cover and a second face facing the other of the handle body and the handle cover so that a gap exists between the second face and the other of the handle body and the handle cover;

an elastic member disposed within the internal space at a grip portion of the vehicle door handle device, wherein the elastic member is entirely disposed between an inner surface of the other of the handle body and the handle cover and the second face of the elastic member.

14. The vehicle door handle device according to claim 13, wherein the elastic part is an antenna or a sensor.

15. The vehicle door handle device according to claim 13, wherein the elastic member contacts the second face of the elastic part.

16. The vehicle door handle device according to claim 13, wherein the grip portion of the vehicle door handle device is formed between a hinge arm portion formed at one end of the vehicle door handle device in a longitudinal direction and an attaching portion formed at the other end of the door handle device in the longitudinal direction, and the vehicle door handle is pivotally mounted relative to a door outer panel via the hinge arm portion.

* * * * *

UNITED STATES PATENT AND TRADEMARK OFFICE
CERTIFICATE OF CORRECTION

| | | |
|---|---|---|
| PATENT NO. | : 7,598,469 B2 | Page 1 of 1 |
| APPLICATION NO. | : 10/829444 | |
| DATED | : October 6, 2009 | |
| INVENTOR(S) | : Tanimoto et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1501 days.

Signed and Sealed this

Fourteenth Day of December, 2010

David J. Kappos
*Director of the United States Patent and Trademark Office*